United States Patent [19]

White et al.

[11] Patent Number: 5,582,856

[45] Date of Patent: Dec. 10, 1996

[54] APPARATUS AND METHOD FOR MAKING A MULTI-FLAVORED FROZEN CONFECTION

[76] Inventors: Neal E. White, 64 Ogle Rd., Old Tappan, N.J. 07675; Kenneth D. Margolis, 10 Cedar Hollow Dr., Rose Valley, Pa. 19086

[21] Appl. No.: 574,116

[22] Filed: Dec. 18, 1995

[51] Int. Cl.$^6$ .................................. A23G 9/00; A23P 1/00
[52] U.S. Cl. .................................. 426/249; 62/75; 62/345; 62/356; 426/279; 426/515; 426/524
[58] Field of Search .................................. 426/249, 279, 426/282, 100, 101, 515, 524; 62/1, 75, 340, 345, 356; 425/126.2

[56] References Cited

U.S. PATENT DOCUMENTS

| | | | |
|---|---|---|---|
| D. 205,876 | 9/1966 | Merritt | D1/102 |
| D. 215,917 | 11/1969 | Hendrick | D1/102 |
| 414,890 | 10/1889 | Taylor | 188/144 |
| 1,429,405 | 9/1922 | Carter et al. | 426/249 |
| 2,589,823 | 3/1952 | Krens | 426/515 |
| 2,614,047 | 10/1952 | Turner | 426/100 |
| 2,674,960 | 4/1954 | De Pasquale | 426/282 |
| 2,747,525 | 5/1956 | Lund | 426/249 |
| 3,971,853 | 7/1976 | Crowder | 426/249 |
| 4,188,768 | 2/1980 | Getman | 426/282 |
| 4,797,295 | 1/1989 | Franco et al. | 426/515 |
| 4,938,975 | 7/1990 | Waller | 426/134 |
| 4,986,080 | 1/1991 | Grigoli et al. | 62/345 |
| 5,343,710 | 9/1994 | Cathenaut et al. | 426/249 |
| 5,374,436 | 12/1994 | White et al. | 426/249 |

FOREIGN PATENT DOCUMENTS 654251  11/1928  France.

OTHER PUBLICATIONS

Bethelem Carbon & Steel Bars, 11/37, p. 13, Element A, "Star Shaped"Bar, Located in D1/106.

*Primary Examiner*—George Yeung
*Attorney, Agent, or Firm*—Lerner, David, Littenberg, Krumholz & Mentlik

[57] ABSTRACT

A system and method for making a frozen confection having a plurality of differently flavored or colored sections are provided. After creating in a mold a frozen outer layer comprising the ingredients for a first flavor or color, a carving means, such as a heated tool or a nozzle ejecting high-pressure gas, removes a portion of the frozen outer layer in accordance with a predetermined pattern. The ingredients for a second flavor or color then are added, and the mold is subjected to freezing to form the final product. Alternatively, a tool having protrusions contacting portions of the inner surface of the mold is inserted into the mold, before or after insertion of the first ingredients, the first ingredients are frozen, the tool is removed, and the second ingredients then are added and frozen. In another embodiment, a first flavor or color is sprayed onto the inner wall of the mold in a pattern and frozen. A second flavor or color then is added to the mold in liquid form and frozen to form a multi-flavor or multi-colored frozen confection.

68 Claims, 9 Drawing Sheets

INNER BODY INSERTION/REMOVAL STATION

APPARATUS AND METHOD FOR MAKING A MULTI-FLAVORED FROZEN CONFECTION

BACKGROUND OF THE INVENTION

This invention pertains to apparatus and methods for making frozen confections, and, more particularly, to apparatus and methods for making frozen confections having a plurality of differently flavored or colored sections. The subject matter of U.S. Pat. No. 5,374,436, which issued on Dec. 20, 1994 to the same inventors, is incorporated herein by reference.

Apparatus for manufacturing frozen confections generally comprises a plurality of molds affixed to a conveyor or rotary table for moving the molds through various processing stations. These stations conventionally comprise: (a) a filling station where the molds are filled with ingredients in liquid form; (b) a stick-inserting station where sticks are inserted into the molds; (c) a freezing station where the molds are subjected to temperatures below freezing to cause solidification of the liquid ingredients; and (d) a product-withdrawing station where the frozen confections are removed from the molds. As a final step, in some cases, the frozen confections are dipped into a bath comprising the ingredients of a coating (e.g., chocolate).

Frozen confections comprising more than one flavor or color also are known. U.S. Pat. No. 2,747,525 to Lund discloses a method and apparatus for manufacturing such a product. In Lund, the molds are filled with a first ingredient in liquid form and then immersed in a brine solution having a temperature below freezing. Before the inner core of the product freezes, this portion is vacuumed out of the mold. A second ingredient in liquid form then is injected into the mold, and the mold again is immersed in the brine solution. The resultant product is a frozen confection comprising an outer layer of one flavor or color and an inner core of a second flavor or color. Using the Lund System, however, the second flavor or color is not visible to the consumer, except at the product's base.

U.S. Pat. No. 3,971,853 to Crowder discloses an apparatus and method for making a frozen confection having a plurality of different flavors or colors. Crowder, however, uses a complicated arrangement of nozzles for filling the molds which deliver different ingredients to the molds in a semi-liquid state. Using the Crowder system, moreover, the ingredients are intermingled such that the different flavors or colors do not form distinct sections.

U.S. Pat. No. 1,429,405 to Carter et al. discloses a method for making a frozen confection having a plurality of differently flavored or colored sections. In Carter, a dye or punch is used to remove a portion of the frozen confection after the frozen confection is removed from the mold. The resultant cavity then is filled with an ingredient, in liquid form, having a different flavor or color, and the entire product then is subjected to additional freezing. This method is ill-suited for mass production.

U.S. Pat. No. 2,674,960 to DePasquale discloses a method for making a frozen confection having a plurality of different flavors or colors. Following partial filling of a first mold with a first ingredient, a second, smaller mold is inserted into the first mold to cause the first ingredient to fill the space between the two molds. The first ingredient then is frozen and the second mold is removed. The resultant cavity in the product then is partially filled with a second ingredient, and the same steps are repeated using a yet smaller mold. Using the DePasquale system, only the first flavor or color is visible to the consumer.

U.S. Pat. No. 4,986,080 to Grigoli discloses an apparatus and method for making a frozen confection having a plurality of different flavors or colors. The Grigoli method, however, requires substantial modifications to conventional, frozen-confection manufacturing apparatuses. The Grigoli apparatus operates on a double-step principle in which rows of molds advance two-by-two. A first filling unit fills a first row of molds but skips the subsequent second row of molds. The ingredients within the molds of the first row then are frozen and, at a first removal and inserting station, the frozen products are removed from these first molds and inserted into the molds of the second row. The second molds have a cross-section such that when the frozen product is inserted into the second molds, space remains between the product and the inner walls of the second molds at at least some locations. A second ingredient in liquid form then is inserted into the second molds to fill these spaces. In a variation of this process disclosed in U.S. Pat. No. 5,343,710 to Cathenaut et al., the second molds are partially filled with the second ingredient before the frozen products are inserted into the second molds. In either case, the second molds are transmitted to a second freezing station, and then to a final withdrawal station where the final product is withdrawn. This double-step method substantially complicates, and increases the expense, of manufacturing a frozen confection.

U.S. Pat. No. 4,188,768 to Getman discloses an apparatus for producing a frozen confection comprising a paper-covered comestible cone containing ice cream. In order to prevent the cones from getting soggy, the interior of the cones is completely covered with a liquid chocolate composition. The chocolate is mixed with compressed air and sprayed through nozzles placed above the cones. The chocolate forms a continuous, liquid-impervious film. The confection is later chilled to solidify the ice cream and the sprayed chocolate.

SUMMARY OF THE INVENTION

The present invention provides an apparatus and method for making a frozen confection having a plurality of distinct, visible, differently flavored or colored sections. Applicants' system and method use conventional, ice cream making equipment and require only the addition of stations to this equipment.

In one embodiment of Applicants' system and method, molds for an ice-cream product are filled with a first ingredient for a first flavor or color and are subjected to freezing in a conventional manner. After the outer layer of this ingredient is substantially frozen, however, but before complete freezing of the product's core, the liquid comprising the core is withdrawn, preferably through vacuuming or similar means. Each mold then is advanced to a carving station where a carving means, such as a laser, a stream of pressurized gas, or a mechanical tool, is inserted into the mold's core. This carving tool is programmed to remove, or cut out, a portion of the frozen outer layer of the first ingredient in accordance with a predetermined pattern.

A plurality of carving means may be used to remove successive portions of the outer layer. In a preferred embodiment, three heated male tools are used to remove successively deeper regions in a continuous portion of the outer layer. For carving deep, lengthwise portions of the outer layer, the use of three successive tools, instead of a single tool, has been found advantageous because the area of the outer layer adjoining the portion to be removed is better preserved.

Following carving of the frozen outer layer, the molds are advanced to a second filling station where a second ingredient for a second flavor or color is inserted into the molds. The molds then are moved to a stick inserting station where sticks are inserted into the molds. The frozen confections then are completely frozen at a final freezing station and, at a withdrawal station, the final products are removed from the molds.

By including further intermediate freezing, liquid-withdrawal and carving stations in the process, frozen confections comprising more than two flavored or colored sections can be manufactured. For example, rather than completely freezing the frozen confections at the second freezing station, only partial freezing can occur at this station, followed by a second removal of the unfrozen ingredients within the products' cores. A second carving station then can carve a second pattern through the first or second frozen layers, or both. A third ingredient then can be inserted into the molds, followed by final freezing, to create an intricate pattern of distinct, visible, multiple flavors or colors within a single frozen confection.

In an alternative embodiment, rather than partially freezing the first ingredient and withdrawing the liquid comprising the core of this ingredient, a solid or hollow body is inserted into the mold, either before or after insertion of the first ingredient. This body is shaped in order to be insertable into, and withdrawable from, the mold, and such that, when inserted, a space exists between the inner wall of the mold and the outer surface of the body at some locations. The first ingredient, upon insertion into the mold, occupies this space and is frozen. The body then is withdrawn from the mold, preferably by applying heat to thaw the first ingredient in the area immediately adjacent the body's outer surface. Heat may be applied by, for example, moving the molds to a heated environment, passing an electrical current through the body or inserting chemical substances into the body such that a heat-producing reaction occurs.

In another embodiment of Applicants' system and method, molds for a frozen-confection product are partially filled with a first ingredient for a first flavor or color. A solid or hollow male tool having fixed protrusions for contacting the inner surface of the mold is then inserted into each mold, displacing the first ingredient into the passageways between the protrusions. Alternatively, a male tool is placed in each mold before filling the mold with a first ingredient or ingredients. Each mold is then advanced to a freezing station where the first ingredient is frozen. In the alternative, insertion of the first ingredient or ingredients into the molds occurs at a freezing station. Following freezing of the first ingredient, each mold is advanced to a tool withdrawal station, where the male tool is heated and withdrawn from the mold. Second ingredient or ingredients are then added and frozen, creating on the outer surface of the frozen confection a visible pattern of distinct flavors or colors.

In yet another embodiment, the molds are first chilled in a freezing station. The molds then advance to a spraying station, where a first ingredient comprising a first flavor and/or color is sprayed in a fine mist onto an inner surface of the mold. In the alternative, this spraying occurs at a freezing station. A first freezing station may be used to chill the molds and a second freezing station used for spraying the first ingredient or ingredients, or, in the alternative, a single freezing station may be used for both steps. The spraying of the first ingredient onto the inner surface of the mold can be uniform or in a pattern. Additional ingredients comprising additional flavors and/or colors may also be sprayed on the surface of the mold to create a more complex pattern. The molds then advance to a metering station where a final liquid ingredient is added to fill the mold, adding an additional color or flavor to the surface pattern. The final product is then frozen and removed from the molds.

An advantage of all embodiments of the present invention is that each line of molds affixed to the conveyor or rotary table of a frozen-confection manufacturing machine produces final products during a single cycle through the machine. This is an advantage over the prior art two-step systems disclosed in U.S. Pat. Nos. 4,986,080 and 5,343,710 where final products are produced only by every other line of molds which cycle through the machine. The present system, therefore, requires less floor space and fewer molds.

DETAILED DESCRIPTION OF THE PREFERRED EMBODIMENTS

Figure 1:
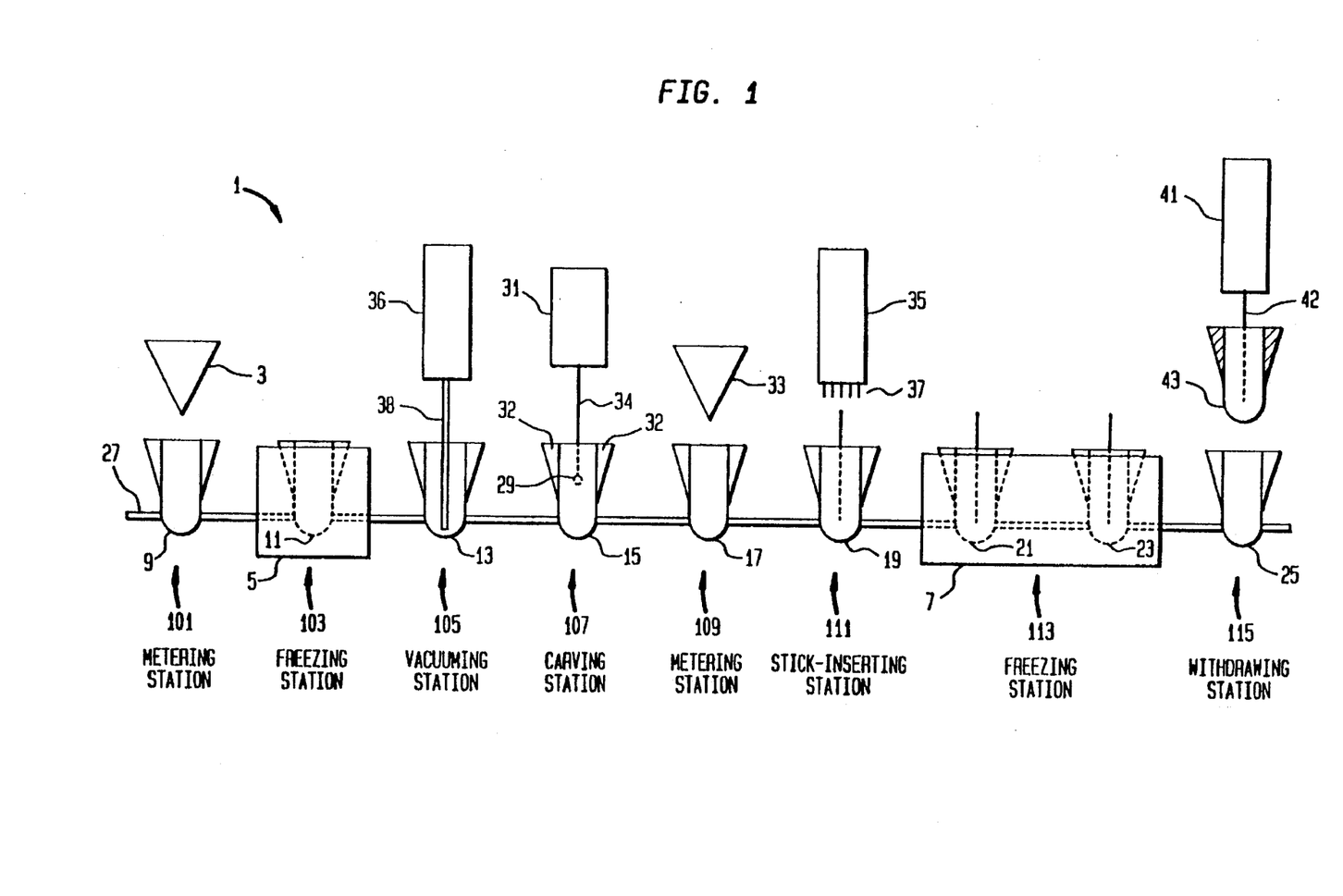
FIG. 1 is a functional block diagram of a frozen confection manufacturing system in accordance with the present invention.

A functional block diagram of a frozen confection manufacturing system in accordance with the present invention is shown in FIG. 1. System 1 comprises a plurality of rows of molds 9, 11, 13, 15, 17, 19, 21, 23 and 25 affixed to rotary table 27. In the alternative, rotary table 27 may comprise an in-line conveyor. Rotary table 27 moves the rows of molds through various stations where various steps in the frozen-confection manufacturing process occur. These stations include metering station 101, freezing station 103, vacuuming station 105, carving station 107, metering station 109, stick-inserting station 111, freezing station 113 and withdrawing station 115.

At metering station 101, filling unit 3 inserts first ingredients in liquid form into the molds. The molds then are transported to freezing station 103 where they enter freezing tank 5. Alternatively, metering station 101 (in addition to all other intermediate stations except for the final-product withdrawal station) may be above freezing tank 5. This tank generally contains a brine bath whose temperature is below freezing to cause rapid freezing of the first ingredients. This freezing progresses from the inner walls of the molds into the molds' central cores. Before complete freezing of the central cores, the molds are moved.

At vacuuming station 105, vacuum unit 36 inserts hose 38 into the molds. Following this insertion, vacuuming unit 36 withdraws the unfrozen liquid comprising the molds' central cores. Remaining in the molds is a frozen outer layer of first ingredients. Preferably, this outer layer is approximately 1/16 inches thick. This thickness has been found sufficient to remain intact during subsequent carving or melting operations, while requiring, if a heated tool is used for carving, only moderate heat to carve or melt a pattern, preserving the remaining outer layer intact. Following this withdrawal of the unfrozen liquid, the molds are moved to carving station 107.

In the embodiment of FIG. 1, carving station 107 comprises a nozzle 29 for directing high-pressure air, or gas, preferably sanitized, on the outer, frozen layer of ingredients within the molds. The nozzle 29 is attached to a robotic arm 34. The nozzle and robotic arm are controlled by a control system 31. In the alternative, nozzle 29 may be replaced by a laser or a mechanical cutting tool.

The control system 31 is programmed to insert the nozzle 29 into the molds, activate the pressurized gas at appropriate times and move the nozzle 29 in a predetermined pattern to remove predetermined portions of the frozen outer layer of the first ingredient. Programming for such activation and robotic movement is well known in the art. In this case, nozzle 29 is programmed to remove the frozen outer layer adjacent wing-sections 32 of the molds. Upon completion of this removal, nozzle control system 31 causes the arm 34 and nozzle 29 to move out of the molds. The molds are then moved to the metering station 109.

At metering station 109, filling unit 33 inserts second ingredients, different in color and/or flavor from the first ingredients, into the molds in the same manner as at metering station 101. These second ingredients fill the cores and wing-sections of the molds and surround the portions of the frozen outer layers of the first ingredients remaining in the molds. The molds then are moved to stick-inserting station 111.

At stick-inserting station 111, stick-inserting unit 35 inserts into each of the molds one of conventional plastic or wooden sticks 37. The molds then are moved to freezing station 113.

In a process similar to that at freezing station 103, freezing station 113 contains a freezing tank 7 with a brine solution kept at a temperature below freezing. The molds within freezing tank 7 remain surrounded by the brine solution until all of the ingredients within the molds are completely frozen. A freezing tank, similar to freezing tanks 5 and 7, may, in the alternative, extend from metering station 101 through all, or substantially all, intermediate stations through to withdrawing station 115.

Final, two-flavored frozen confection 43 is withdrawn from the molds at withdrawing station 115. Withdrawing unit 41 grasps the sticks within the frozen confections, e.g., stick 42, and pulls the frozen confections from the molds. In order to facilitate this process, the frozen ingredients within the molds may be slightly thawed, through the use of warm water or other means, prior to withdrawing the product.

Figure 2:
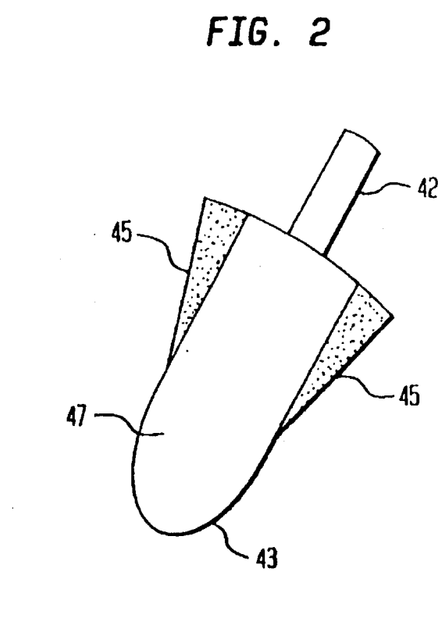
FIG. 2 shows in perspective view a multiple flavored or colored frozen confection manufactured using the system of FIG. 1.
Figure 3:
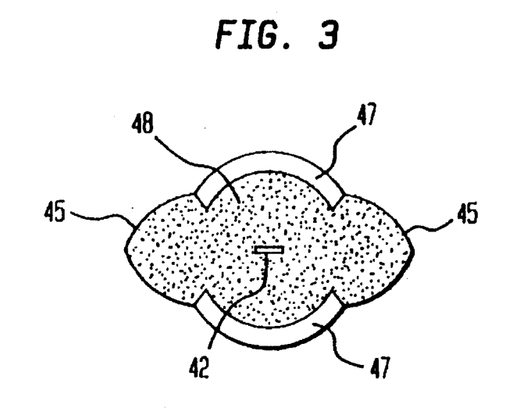
FIG. 3 is a bottom view of the multiple flavored or colored frozen confection of FIG. 2.

Two-flavored frozen confection 43 is shown in greater detail in FIGS. 2 and 3. As shown in these figures, frozen-confection 43 comprises distinct, visible sections, each comprising a different flavor and/or color. Outer main section 47 consists of the ingredients entering the molds at metering station 101, and wing-sections 45 and inner core 48 consist of the ingredients entering the molds at metering station 109. As explained above, when the second ingredients enter the molds, they fill wing-sections 32 and the molds' central core.

Figure 4:
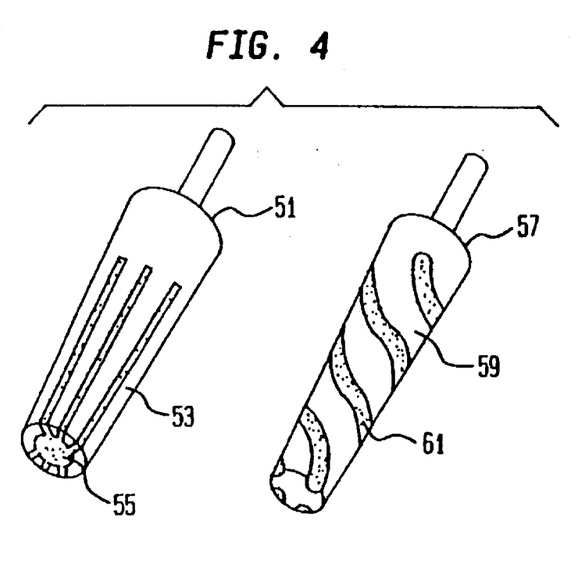
FIG. 4 shows other multiple flavored or colored frozen confections that can be manufactured in accordance with the present invention.

FIG. 4 shows examples of other two-flavored frozen confections that can be manufactured using the system and method of the invention. The manufacture of these frozen confections requires only the use of different molds on system 1 and reprogramming of nozzle-control system 31. Two-flavored frozen confections 51 and 57 comprise, respectively, first sections 53 and 59 and second sections 55 and 61. The ingredients comprising sections 53 and 59 enter the molds at metering station 101, and the ingredients comprising sections 55 and 61 enter the molds at metering station 109.

The ingredients comprising the frozen confections' second sections, e.g., sections 55 and 61 of frozen confections 51 and 57, respectively, include the first ingredients removed at carving station 107 which melt into the cores of the molds. If these removed portions are small in volume, they have an insignificant effect upon the flavor and/or color of the second ingredients. If desired, however, a second vacuuming station can be inserted on system 1 after the first carving station to remove these melted first ingredients.

Also, by including within system 1 further intermediate freezing, liquid-withdrawing and carving stations, frozen confections comprising more than two flavored or colored sections can be manufactured. For example, rather than completely freezing the frozen confections at freezing station 113, only partial freezing can occur at this station, followed by removal of the unfrozen second ingredients. A second carving station then can be used to carve a second pattern within the first or second frozen layers, or both, to create an intricate pattern of distinct, visible, sections of flavors or colors within a single frozen confection.

Figure 5:
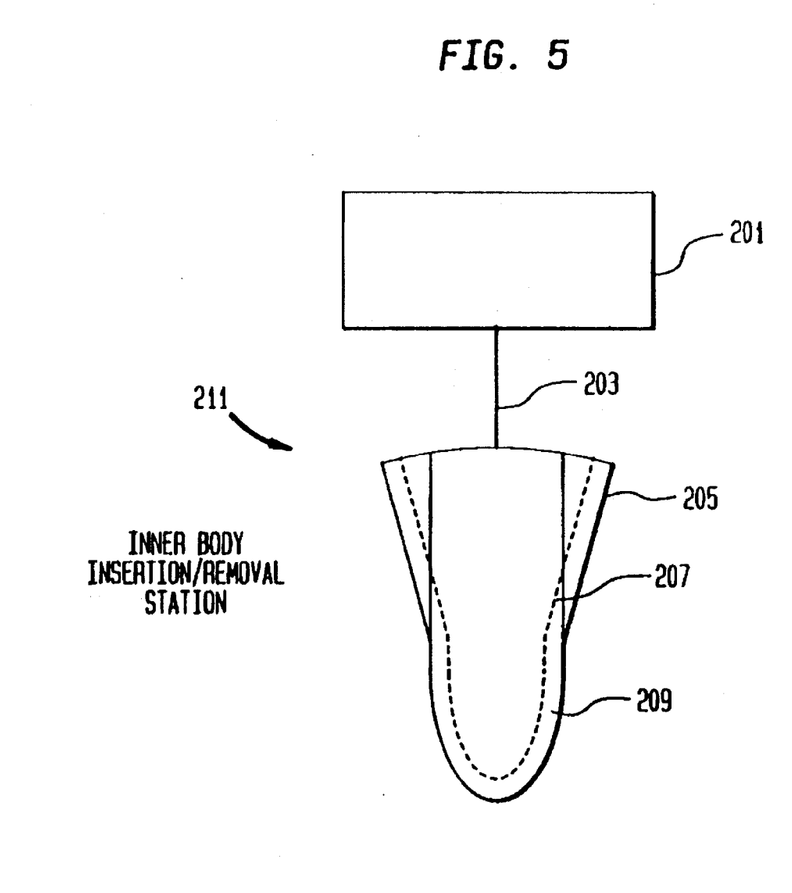
FIG. 5 is a functional block diagram of an inner body insertion removal station in accordance with a second embodiment of the present invention.
Figure 6:
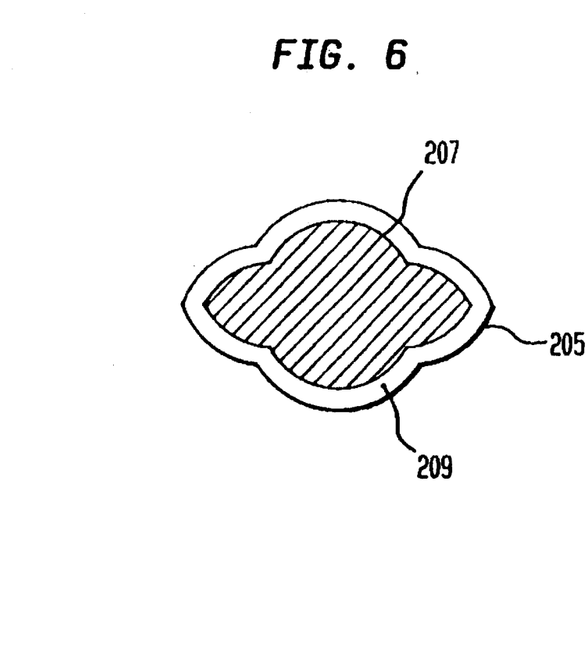
FIG. 6 is a cross-section of the mold and inner body shown in FIG. 5.

A second embodiment of the present invention is shown in FIGS. 5 and 6. In this embodiment, rather than partially freezing the first ingredients at freezing station 103 and withdrawing the unfrozen liquid comprising the molds' central cores at vacuuming station 105, system 1 incorporates inner body insertion/removal station 211. This station may be part of freezing station 103.

In accordance with this second embodiment, inner-body control system 201 inserts an inner body 207 into mold 205 using robotic arm 203. The molds are filled only partially with the first ingredients at metering station 101 in order that this insertion does not cause spilling of the first ingredients from the molds but causes these ingredients to occupy space 209 between the inner wall of mold 205 and the outer surface of inner body 207. In the alternative, the molds can be filled with the first ingredients after the inner body is inserted into the mold. The molds then are subjected to freezing temperatures to freeze the first ingredients, and, following this freezing, inner-body control system 201 withdraws inner body 207 from the mold. This withdrawal may be facilitated by applying heat from an electrical circuit (not shown), within inner body 207 and activated by inner-body control system 201. This heat causes thawing of the first ingredients in the area immediately adjacent the outer surface of inner body 207. In the alternative, heat may be applied directly to the molds or chemical substances may be inserted into a cavity within inner body 207 to cause a heat-producing reaction.

Following removal of inner body 207, the molds may be moved to carving station 107 where a pattern is carved in the frozen first ingredients in the same manner as described above.

Other embodiments of the present invention are shown in FIGS. 7–12. For example, carving station 107 (FIG. 1) may comprise one or more carving-tool stations, such as station 310 (FIG. 7), each having a heated carving tool 320, for removing a predetermined portion of the outer frozen layer 322 of the frozen confection. Tool 320 is maintained at a temperature above the melting point of the first ingredient, preferably approximately 150° F. before the tool is inserted into the mold. In a preferred embodiment, the tool is heated using an electric rod heater with a thermostat. Alternatively, the tool may be heated by a pair of radiant heaters placed on either side of the tool when the tool is retracted from the mold. In yet another embodiment, steam or hot water may be circulated through passageways in the tool. The tool 320 is mounted on a support 325 such as a robotic arm. Outer surfaces 321 of the tool 320 touch, or come within close proximity to, the inner wall 305 of the mold 306. Upon doing so, portions of the outer layer 322 proximate the outer surfaces 321 of the tool are removed as the tool is inserted into the mold. Liquid relief grooves 359 in the outer surfaces 321 permit melted product to flow out of the melting region.

Figure 7:
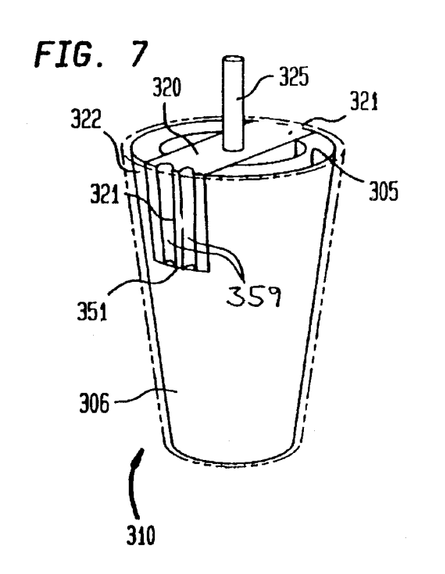
FIG. 7 is a partial perspective view of a first carving tool station in accordance with a third embodiment of the invention.

The tool 320 has two diametrically opposite tapered outer surfaces 321 for removing portions of the outer layer extending from the top of the mold. The surfaces 321 are positioned to simultaneously touch, or come within close proximity of, the upper inner surface 305 of the mold when the tool is inserted into the mold. Tool 320 may comprise any outer configuration to produce any desired pattern on the outer surface of the frozen confection.

Figure 8:
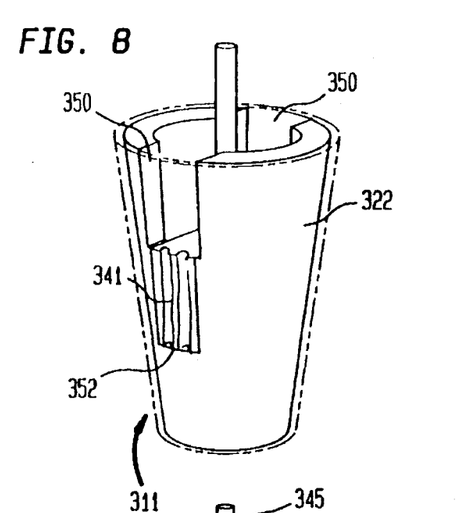
FIG. 8 is a partial perspective view of a second carving tool station in accordance with the third embodiment of the invention.
Figure 9:
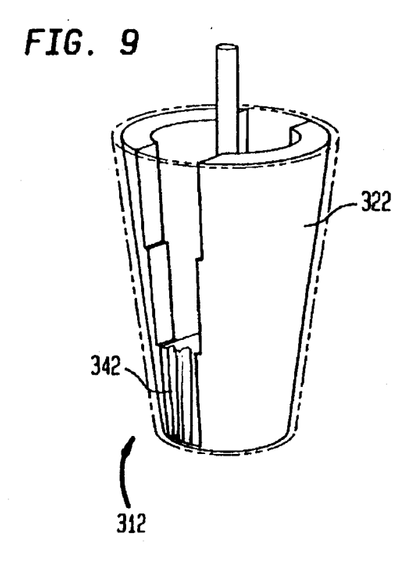
FIG. 9 is a partial perspective view of a third carving tool station in accordance with the third embodiment of the invention shown.

FIGS. 8 and 9 show further lengthwise openings 350 being formed progressively from the top of the outer layer 322 by a series of tools similar to that shown in FIG. 7. Initially, a top portion of the opening 350 having a lower edge 351 is formed using tool 320 (FIG. 7). As shown in FIG. 8, a mid-level portion of the opening 350 having a lower edge 352 is next formed using a second tool 341. A bottom portion of the opening 350 is formed as shown in FIG. 9 using tool 342. In a conventional stepped frozen-confection manufacturing machine, lines of tools, such as tools 320, 341 and 342, can be situated sequentially along the conveyor such that the frozen outer layers within each line of molds are removed in steps and all tools are operating simultaneously. On the other hand, the three tools 320, 341, 342 may be combined in a single tool by, e.g., structuring a single tool which extends the length of the mold. It has been found, however, that for a typical product of 6–9 inches in length, it is impractical to form a full-length opening within the outer layer of the frozen confection using a single entry with one lengthwise tool without destroying other portions of the outer layer. By using successive applications of one or more heated tools to form the opening in steps limited to about 2 inches in length, the outer layer can be precisely carved, and portions of the outer layer between the openings preserved intact.

Figure 11:
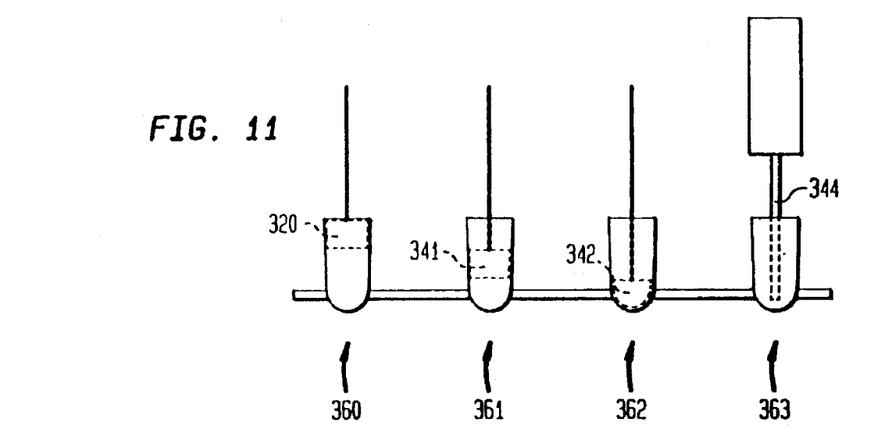
FIG. 11 is a partial functional block diagram of sequential carving tool stations in accordance with the embodiments of FIGS. 7–9.

As shown in FIG. 11, the three heated tools 320, 341 and 342 may comprise sequential carving stations 360, 361 and 362, replacing the single carving station 107 of FIG. 1. The tool 320 removes frozen confection from the top 2 inches of the outer layer, the tool 341 removes frozen confection from the middle 2 inches and the tool 342 removes frozen confection from the bottom 2 inches of the outer layer. The tools may be heated to the correct temperature between cycles or may be thermostatically maintained within a working temperature range. Melted material comprising the removed portions of the outer layer collects in the core of the mold. In a preferred embodiment, after the carving process, the melted first product is removed by vacuum 344 at a single vacuuming station 363.

Figure 12:
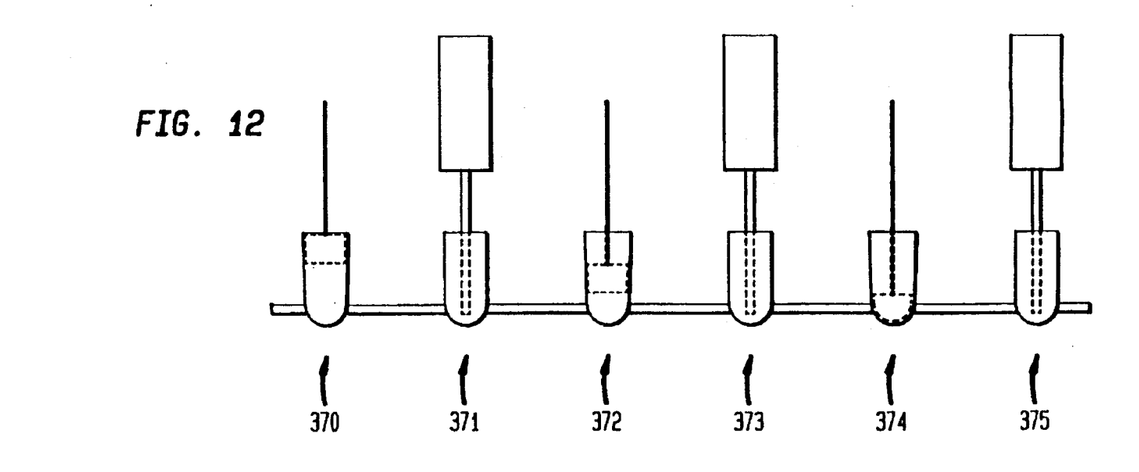
FIG. 12 is a partial functional block diagram of sequential carving tool stations in accordance with a variation of the embodiment shown in FIG. 11.

An alternative embodiment is shown in FIG. 12, wherein vacuum stations 371, 373 and 375 are positioned after heated tool stations 370, 372 and 374 for removing melted material after each carving step. This arrangement discourages refreezing of the first product in the core of the mold during subsequent carving operations. Alternatively, vacuuming after the carving steps may be eliminated altogether. In that case, the melted liquid is left at the top of the frozen confection to provide a top color. Also, all of the carving stations may be located within a freezing tank in order to further maintain the integrity of the outer layer 322 during formation of the apertures.

Figure 10:
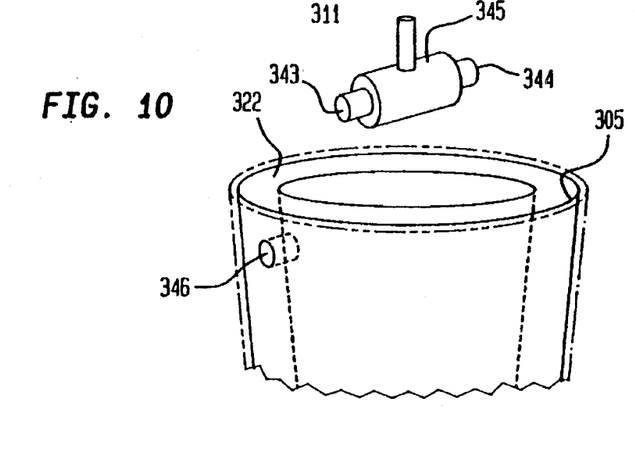
FIG. 10 is a partial perspective view of an alternatively structured carving tool in accordance with a variation of the third embodiment of the invention.

An alternative configuration for a heated cutting tool is shown in FIG. 10. One or more outer surfaces 343, 344 of the heated tool 345 are positioned within an envelope smaller than the mold interior. The tool is moved laterally after it is placed in the mold, separately bringing each of the outer surfaces 343, 344 into contact, or close proximity with, the inner wall 305 of the mold, thereby removing portions of the outer frozen layer 322 of the product. Apertures, such as aperture 346, may thereby be formed in the outer layer 322. Like tool 320, tool 345 may be maintained above the melting point of the first ingredient by a heating means.

After completion of the carving operation, the molds move to the metering station 109 (FIG. 1) for addition of the second product. The metering station 109 may be located either within a freezing tank (not shown) or prior to the freezing tank 7 (FIG. 1). Adding the second product within a freezing tank insures further rigidity of the outer shell and reduces mixing of the first and second products. While these and subsequent processes are described as having discrete freezing tanks, machines having a continuous brine bath or brine spray available along the entire system, such as a Vitaline® machine, may be used. Preferably, the brine spray may be disabled where freezing is not desired.

Figure 13:
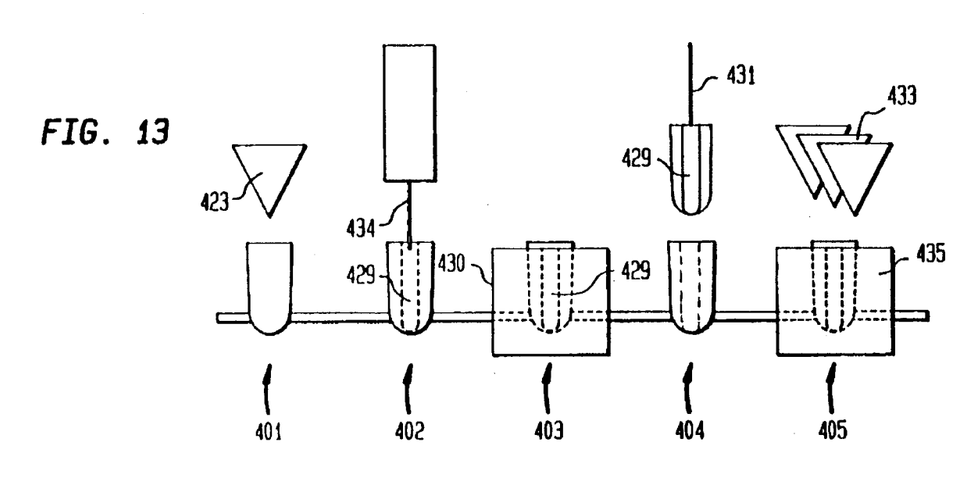
FIG. 13 is a partial functional block diagram of a frozen confection manufacturing system using a male tool in accordance with a fourth embodiment of the invention.

In another embodiment of the invention shown in FIGS. 13–16, a male tool is inserted into the mold before the first ingredient is frozen in the mold. The first ingredient can be inserted into the mold either before or after insertion of the male tool. FIG. 13 is a schematic representation of the first stations of a process according to this embodiment. At metering station 401, a filling unit 423 inserts a first ingredient in liquid form into the mold. The mold is only partially filled.

The molds are then transported to the tool insertion station 402, where the male tool 429 is inserted into the mold using robotic arm 434. The male tool has a geometry such that, upon this insertion, the male tool's outer surfaces contact the inner surfaces of the mold. For example, the male tool 390 shown in FIG. 15 has surfaces 396 that contact the inner surface 392 of the mold 393 when the tool is inserted into the mold. As the male tool is inserted into the mold, the liquid first ingredient is restricted to portions 397 of the mold not occupied by the male tool 390. Relatively little or no first ingredient remains at the interfaces between the outer surfaces 396 of the male tool and the mold inner surface 392.

Returning to FIG. 13, the mold, together with the male tool 429 and the first ingredient, are transported to a freezing station 403, where the first ingredient is frozen in freezing tank 430. The mold is then transported to a tool removal station 404. The tool may be heated at this station by chemical means, by conducting electricity through the mold, and/or by using an external electric heater. Heat also may be applied by raising the environmental temperature surrounding the molds; e.g., by using hot water. The tool is heated sufficiently to release any first ingredient frozen to its surface, but not so much as to significantly thaw the remaining first ingredient in the mold. The male tool 429 is then removed using, for example, a robotic arm 431 similar to arm 434. The frozen first ingredient remains in the mold, forming a pattern on the mold inner surface.

The mold is then transported to a metering station 405 where additional ingredients, different in flavor and/or color from the first ingredient, are added to the mold. The additional ingredients fill the sections 398 (FIG. 15) within the mold left by the male tool. The additional ingredients are preferably added within a freezing tank 435 in order that the additional ingredients freeze quickly and stay relatively separate from the first ingredient. Where a male tool such as tool 390 (FIG. 15) is used, a single, continuous passageway remains after removing the tool. Only a single metering device 433 is used, therefore, to add a single additional ingredient to fill this passageway.

In an alternative embodiment, a male tool 440 (FIG. 16), having multiple male elements 441 is used. Each element has an external surface 442 for contacting the inside wall of the mold. Each male element 441 leaves a separate lengthwise section in the frozen first ingredient after the tool is removed. In that case, the metering device 433 (FIG. 13) may comprise multiple filling elements for introducing a plurality of ingredients, each having a different color and/or flavor, into the plurality of passageways 441.

After leaving the metering station 433, the mold continues through a manufacturing system such as that of FIG. 1, being transported through a stick-inserting station, a freezing station and a product withdrawing station.

Figure 14:
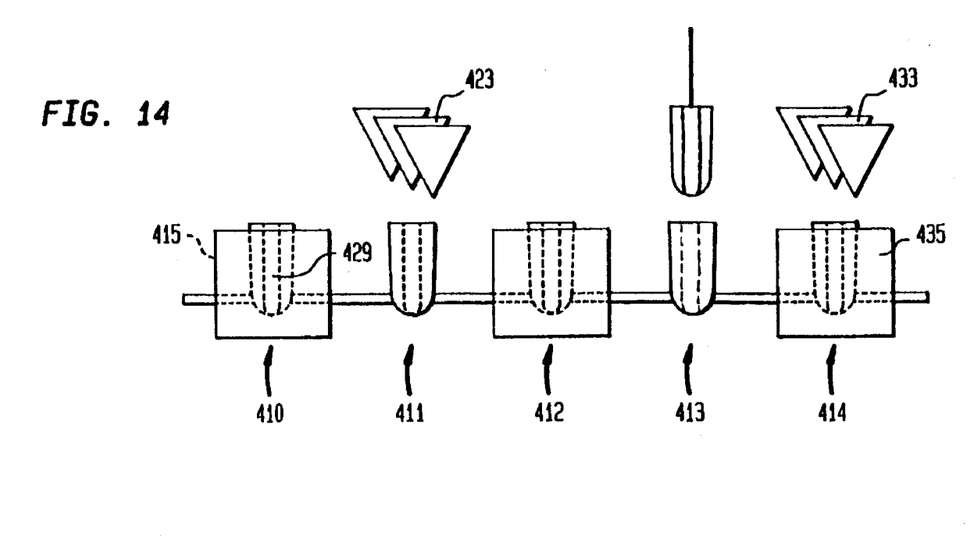
FIG. 14 is a partial functional block diagram of a frozen confection manufacturing system using a male tool in accordance with a variation of the embodiment shown in FIG. 13.
Figure 15:
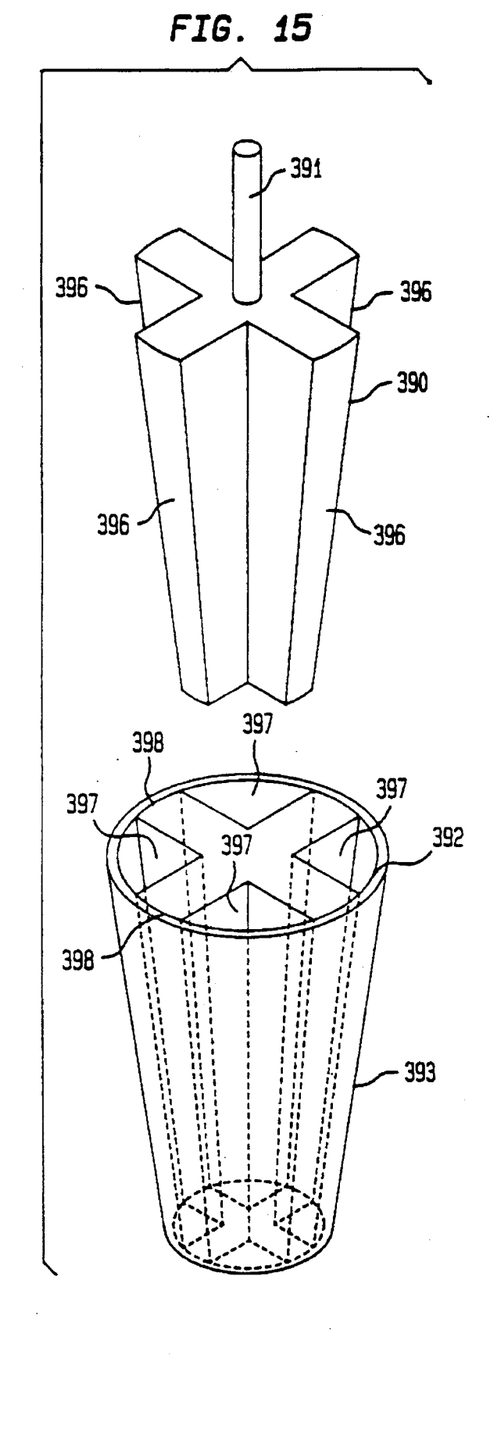
FIG. 15 is a partial perspective view of a male tool and a partially formed frozen confection in accordance with the embodiments shown in FIGS. 13 and 14.
Figure 16:
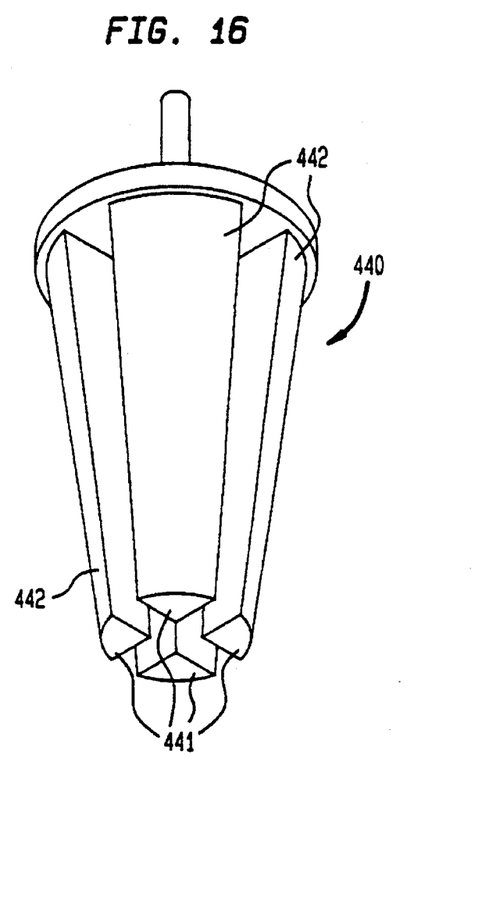
FIG. 16 is a partial perspective view of another male tool in accordance with the embodiments of FIGS. 13 and 14.

In an alternative embodiment of the invention shown in FIG. 14, the male tool 429 is first placed in the mold at a tool insertion station 410. The external surfaces of the male tool contact the inner surface of the mold. The surfaces of the tool and the inner surface of the mold form one or more sections within the mold. Preferably, a freezing tank 415 at the tool insertion station chills the mold, causing the tool to adhere to the inner surface of the mold as surface condensation freezes, sealing the contact surfaces. The mold, together with the male tool, is then transferred to metering station 411, where a first ingredient is inserted in liquid form into the mold, filling the sections. If a male tool, such as tool 390 (FIG. 15) is used, the multiple sections 397 formed by the male tool and the mold's inner wall are distinct and separate. Each section, therefore, may be filled with a different ingredient having a different color and/or flavor. In yet another embodiment, multiple ingredients may be layered vertically within each section by alternate steps of filling and freezing. In other words, one or more sections may be partially filled with one ingredient, caused to freeze, partially filled with a second ingredient, caused to freeze, etc.

The mold, the male tool and the ingredients therein then are transferred to a freezing station 412, where the ingredients are frozen, and to a tool removal station 413, where the freezing is stopped and the male tool 429 is heated and removed as explained above. The mold, containing the frozen first ingredients forming a pattern on the inner surface of the mold, is transferred to a second metering station 414 where an additional ingredient is added to fill the mold. Alternatively, multiple ingredients also may be added at this station in layers, as explained above, or to separately fill multiple separate, distinct sections within the mold (if such exist as a result of the male tool's structure).

Figure 17:
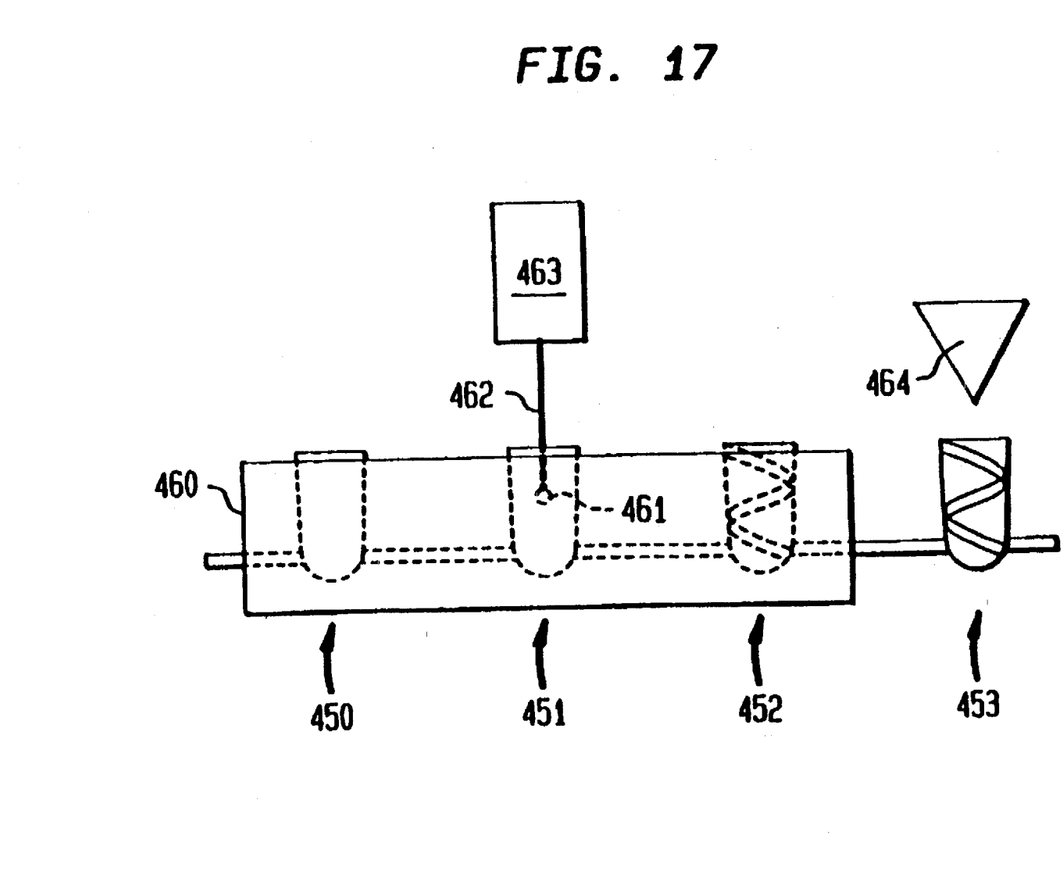
FIG. 17 is a partial functional block diagram of a frozen confection manufacturing system having a spraying station in accordance with a fifth embodiment of the invention.

An embodiment of the invention using a spray nozzle to apply one or more first ingredients is shown in FIG. 17. A reusable mold is first chilled to a temperature below the freezing point of the first ingredients (below approximately 32° F.) at freezing station 450 inside a freezing tank 460. In a preferred embodiment, the mold is chilled to approximately −20° F. to 0° F. using −40° F. brine solution. The mold then advances to a spraying station 451, which is preferably also inside the freezing tank 460. At the spray station 451, a nozzle head 461 is manipulated, for example, by a robotic arm 462, to direct a fine mist of liquid or semi-frozen ingredient onto an inside wall of the mold. The nozzle may be moved to within the mold, proximate the area of the inner wall to be sprayed. Alternatively, the nozzle may be kept above the mold, directing the spray downward onto the inside walls. The flow of ingredient and the robotic arm are controlled by controller 463. The sprayed ingredient freezes in place without any significant running.

Figure 18:
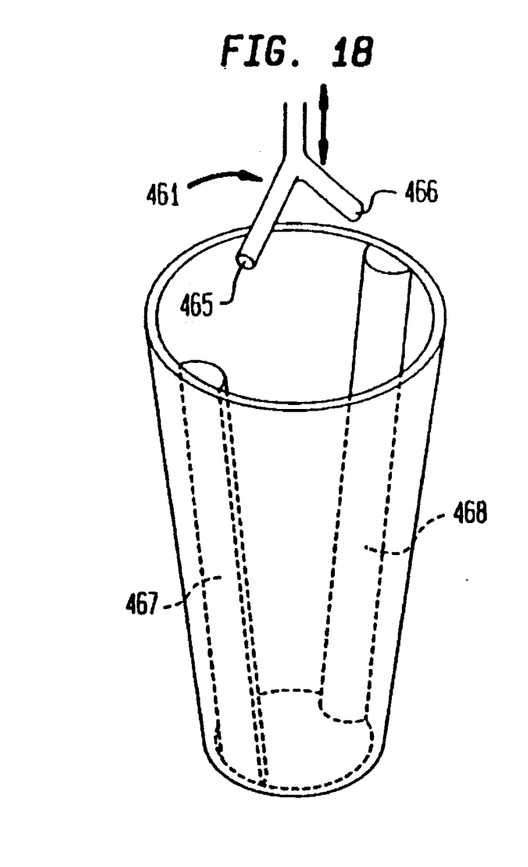
FIG. 18 is a partial perspective view of a first ingredient spraying station having two nozzles in accordance with the embodiment shown in FIG. 17.

By manipulating the robotic arm 462 and controlling the spray, patterns may be formed on the inside wall of the mold. By controlling the time of spraying, the thickness of the outer layer also is controlled. FIG. 18 shows a nozzle 461 having two orifices 465, 466. By moving the nozzle head axially down (or up) within the mold during the spray operation, two axial stripes 467, 468 of the first ingredient are formed on the inner wall of the mold. Alternatively, different ingredients having different colors and/or flavors are sprayed through each orifice, forming stripes of different colors. Furthermore, a plurality of nozzles may be used to cover entire areas of the mold with the same or different colors and/or flavors.

Figure 19:
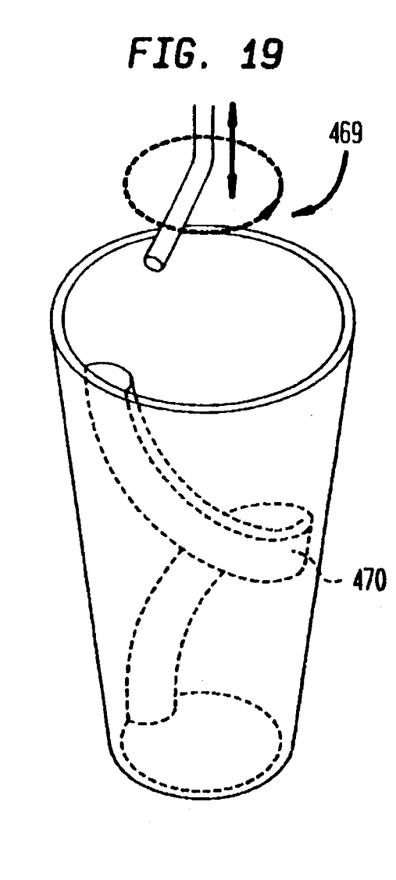
FIG. 19 is a partial perspective view of a first ingredient spraying station for forming a spiral pattern in accordance with the embodiment shown in FIG. 17.
Figure 20:
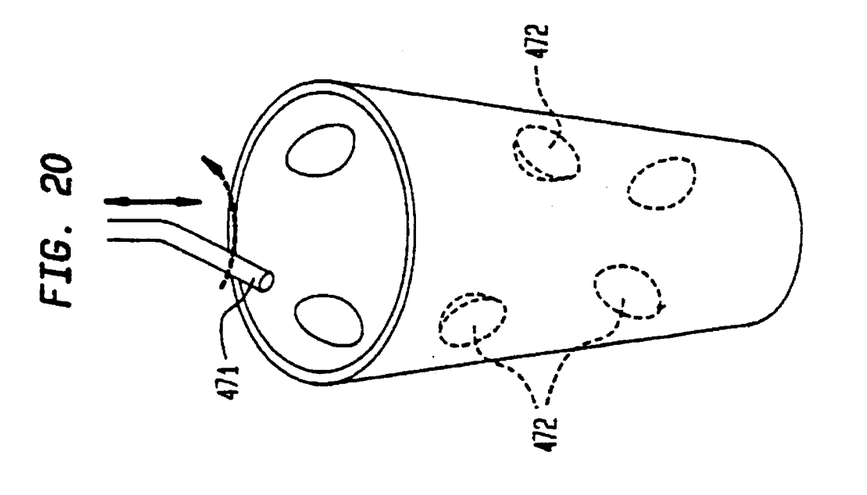
FIG. 20 is a partial perspective view of a first ingredient spraying station for forming dots in accordance with the embodiment shown in FIG. 17.

FIG. 19 shows a helical stripe 470 of a first ingredient formed by simultaneously rotating and translating the nozzle head 469. FIG. 20 shows a pattern of dots 472 formed by rotating and translating the nozzle head 471 while intermittently spraying an ingredient. Other patterns and nozzle configurations will be apparent to those skilled in the art.

If a frozen-confection manufacturing machine which freezes from the bottom is used, it is preferred to begin the spray operation at the bottom of the mold and move the injector up. This method further prevents streaking. On the other hand, if a frozen-confection machine which freezes from the top of the molds down is used, it is preferred that the nozzle start at the top of the mold and work down.

Returning to FIG. 17, after the first ingredient is applied to the inner wall of the mold, the mold is advanced to a freezing station 452, where the pattern is further frozen on the inner wall. The mold is then advanced to a metering station 453, where a second ingredient is added by a filling unit 464. Preferably, this metering also occurs within a freezing tank in order further to insure the integrity of the pattern of the first frozen ingredient. Also, alternatively, for this metering, multiple additional ingredients may be layered as described above. The first ingredient remains frozen to the inner wall of the mold, forming a pattern having a background formed by the second ingredient.

After adding the second or additional ingredients, the mold is advanced through stick-inserting, freezing and withdrawing stations as described with reference to FIG. 1. The mold may be heated slightly in order to facilitate removing the frozen confection.

Although particular embodiments of the present invention have been shown and described, many varied embodiments incorporating the teachings of the present invention easily may be constructed by those skilled in the art. For example, depending upon the construction of the high-pressure gas nozzle or other carving tool and the particular portions of the frozen first ingredients for which removal is desired (such as only along the mold's top portions), insertion of the nozzle into the mold itself may be unnecessary.

What is claimed is:

1. A method for making a frozen confection having a plurality of differently flavored or colored sections, comprising:
    (a) creating in a mold a first frozen outer layer comprising a first ingredient of a first flavor or color;
    (b) removing with a first heated male tool a first portion of said first outer layer;
    (c) inserting a second liquid comprising ingredients of a second flavor or color into said mold; and
    (d) freezing said second liquid.

2. The method of claim 1, wherein said step of creating said first frozen outer layer comprises:
    (a) inserting a first liquid comprising said first ingredient into said mold;
    (b) partially freezing said first liquid such that said first liquid comprises said first frozen outer layer and a substantially liquid first inner core;
    (c) withdrawing from said mold the liquid comprising said first inner core.

3. The method of claim 1, wherein said step of creating said first frozen outer layer comprises:
    (a) partially filling said mold with a first liquid comprising said first ingredient;
    (b) inserting a body into said mold such that said first liquid forms an outer layer between said body and said mold;
    (c) freezing said first liquid to create said first frozen outer layer; and
    (d) withdrawing said body from said mold.

4. The method of claim 1, wherein said step of creating said first frozen outer layer comprises:
    (a) inserting a body into said mold such that an empty gap exists between said body and said mold;
    (b) filling said gap with a first liquid comprising said first ingredient;
    (c) freezing said first liquid to form said first frozen outer layer; and
    (d) withdrawing said body from said mold.

5. The method of claim 1, further comprising the step of heating said male tool to approximately 150° F. before said removing of said first portion of said first outer layer.

6. The method of claim 1, further comprising the step of heating said male tool with radiant heaters before said removing of said first portion of said first outer layer.

7. The method of claim 1, further comprising the step of heating said male tool using an electric heater.

8. The method of claim 1, further comprising the step of circulating heated water through said male tool.

9. The method of claim 1, wherein said step of removing comprises inserting said tool downwardly into said mold until the outer surface of said tool is substantially conterminous with the inner surface of said mold.

10. The method of claim 1, further comprising the step of withdrawing from said mold a liquid comprising said first portion in liquid form before said inserting of said second liquid.

11. The method of claim 1, further comprising the step of removing with a second heated male tool a second portion of said first outer layer, before said inserting of said second liquid.

12. The method of claim 11, further comprising the step of removing with a third heated male tool a third portion of said first outer layer, before said inserting of said second liquid.

13. The method of claim 12, wherein said first, second and third portions of said first outer layer are, respectively, portions of the top section, center section and bottom section of said outer layer.

14. The method of claim 12, further comprising the step of withdrawing from said mold a liquid comprising said first, second and third portions in liquid form, after said removing of said third portion of said first outer layer.

15. The method of claim 12, wherein the first, second and third male tools are the same tool.

16. The method of claim 12, further comprising the steps of withdrawing from said mold a liquid comprising said first portion in liquid form before said removing of said second portion; withdrawing from said mold a liquid comprising said second portion in liquid form before said removing of said third portion; and withdrawing from said mold a liquid comprising said third portion in liquid form after said removing of said third portion.

17. The method of claim 1, further comprising:
    (a) partially freezing said second liquid such that said second liquid comprises a substantially frozen second outer layer and a substantially liquid second inner core;
    (b) withdrawing from said mold the liquid comprising said second inner core;
    (c) removing with a second heated male tool a first portion of said second outer layer;
    (d) inserting a third liquid comprising ingredients of a third flavor or color into said mold; and (e) freezing said third liquid.

18. The method of claim 1, wherein the step of removing a portion of said first outer layer with a first male tool further comprises indexing the tool downward into said mold and moving the tool laterally within said mold.

19. The method of claim 1, further comprising the step of placing the mold in a freezing section before said inserting of said second liquid.

20. A system for making a frozen confection having a plurality of differently flavored or colored sections, comprising:
(a) means for creating in a mold a first frozen outer layer comprising a first ingredient of a first flavor or color;
(b) a first heated male tool;
(c) means for removing with said first heated male tool a first portion of said first outer layer;
(d) means for inserting a second liquid comprising ingredients of a second flavor or color into said mold; and
(e) means for freezing said second liquid.

21. The system of claim 20, wherein said means for creating said first frozen outer layer comprises:
(a) means for inserting a first liquid comprising said first ingredient into said mold;
(b) means for partially freezing said first liquid such that said first liquid comprises said first frozen outer layer and a substantially liquid first inner core;
(c) means for withdrawing from said mold the liquid comprising said first inner core.

22. The system of claim 20, wherein said means for creating said first frozen outer layer comprises:
(a) means for partially filling said mold with a first liquid comprising said first ingredient;
(b) means for inserting a body into said mold such that said first liquid is located between said body and said mold;
(c) means for freezing said first liquid; and
(d) means for withdrawing said body from said mold.

23. The system of claim 20, wherein said means for creating said first frozen outer layer comprises:
(a) means for inserting a body into said mold such that an empty gap exists between said body and said mold;
(b) means for filling said gap with a first liquid comprising said first ingredient;
(c) means for freezing said first liquid to form said first frozen outer layer; and
(d) means for withdrawing said body from said mold.

24. The system of claim 20, wherein said means for removing comprises means for inserting said tool downwardly into said mold until the outer surface of said tool is substantially conterminous with the inner surface of said mold.

25. The system of claim 20, further comprising means for withdrawing from said mold a liquid comprising said first portion in liquid form.

26. The system of claim 20, further comprising a second heated male tool and means for removing with said second heated male tool a second portion of said first outer layer.

27. The system of claim 26, further comprising a third heated male tool and means for removing with said third heated male tool a third portion of said first outer layer.

28. The system of claim 27, wherein said first, second and third portions of said first outer layer are, respectively, portions of the top section, center section and bottom section of said outer layer.

29. The system of claim 27, further comprising means for withdrawing from said mold a liquid comprising said first, second and third portions in liquid form.

30. The system of claim 27, wherein said first, second and third male tools are the same tool.

31. The system of claim 27, further comprising means for withdrawing from said mold a liquid comprising said first portion in liquid form before said removing said second portion of said first outer layer; means for withdrawing from said mold a liquid comprising said second portion in liquid form before said removing of said third portion of said first outer layer; and means for withdrawing from said mold a liquid comprising said third portion in liquid form after said removing of said third portion of said first outer layer.

32. The system of claim 20, further comprising:
(a) means for creating in said mold a second frozen outer layer comprising said ingredients of said second flavor;
(b) a second heated male tool;
(c) means for removing with said second heated male tool a first portion of said second outer layer;
(d) means for inserting a third liquid comprising ingredients of a third flavor or color into said mold; and
(e) means for freezing said third liquid.

33. The system of claim 20, wherein said means for removing comprises means for indexing said first tool downwardly into said mold and moving said first tool laterally within said mold.

34. The system of claim 20, further comprising means for subjecting said first outer layer to a temperature below 32° F. during said inserting of said second liquid.

35. The system of claim 20, wherein said means for removing comprises a robotic arm.

36. The system of claim 20, further comprising radiant heaters for heating the male tool before said removing of said first portion.

37. The system of claim 20, further comprising an electric heater for heating said male tool.

38. The system of claim 20, further comprising means for circulating heated water through said male tool.

39. A method for making a frozen confection having a plurality of differently flavored or colored sections, comprising:
(a) inserting a first liquid comprising ingredients of a first flavor or color into a mold;
(b) providing a first body having fixed surfaces at its outer periphery;
(c) inserting said first body into said mold such that said fixed surfaces are substantially in contact with the inner wall of said mold;
(d) freezing said first liquid to form a substantially frozen first outer layer surrounding said fixed surfaces;
(e) withdrawing said first body from said mold;
(f) inserting a second liquid comprising ingredients of a second flavor or color into said mold; and
(g) freezing said second liquid.

40. The method of claim 39, further comprising the steps of:
(a) inserting a third liquid comprising ingredients of a third flavor or color into said mold on top of said first frozen layer;
(b) freezing said third liquid.

41. The method of claim 39, further comprising the steps of:
(a) inserting a third liquid comprising ingredients of a third flavor or color into said mold on top of said frozen second ingredients;

(b) freezing said third liquid.

42. The method of claim 39, wherein said step of providing said first body includes providing said first body with a plurality of male elements for forming a plurality of lengthwise passageways within said frozen first outer layer, and said step of inserting said second liquid includes inserting said second liquid into a first one of said passageways, and further comprising the steps of:

(a) inserting a third liquid comprising ingredients of a third flavor or color into a second one of said passageways; and (b) freezing said third liquid.

43. The method of claim 39, further comprising the step of heating said first body before withdrawing said first body from said mold.

44. A system for making a frozen confection having a plurality of differently flavored or colored sections, comprising:

(a) means for inserting a first liquid into a mold;

(b) a body having fixed surfaces at its outer periphery;

(c) means for inserting said first body into said mold such that said fixed surfaces are substantially in contact with said inner wall;

(d) means for freezing said first liquid to form a substantially frozen first outer layer surrounding said fixed surfaces;

(e) means for withdrawing said body from said mold;

(f) means for inserting a second liquid into said mold; and (g) means for freezing said second liquid.

45. The system of claim 44, further comprising means for chilling said body and said mold to below 32° F. before inserting said first liquid.

46. The system of claim 44, wherein said system further comprises a heater for heating said body.

47. The system of claim 46, wherein said heater is an electrical heater.

48. The system of claim 46, wherein said heater is a chemical heater.

49. A method for making a frozen confection having a plurality of differently flavored or colored sections, comprising:

(a) providing a first body having fixed protrusions at its outer periphery;

(b) inserting said first body into a mold such that said fixed protrusions are in contact with the inner surface of said mold and create a first space bounded by said first body, said protrusions and said mold;

(c) inserting a first liquid comprising ingredients of a first flavor or color into said first space;

(d) freezing said first liquid such that said first liquid comprises a substantially frozen first outer layer;

(d) withdrawing said first body from said mold;

(f) inserting a second liquid comprising ingredients of a second flavor or color into said mold; and (g) freezing said second liquid.

50. The method of claim 49, wherein said step of inserting said fixed body into said mold includes creating a second space bounded by said fixed protrusions, said body and said inner surface, said second space being substantially independent of said first space, and further comprising the steps of inserting a third liquid comprising ingredients of a third flavor or color into said second space; and freezing said third liquid.

51. A method for making a frozen confection having a plurality of differently flavored or colored sections, comprising:

(a) creating in a mold a first frozen outer layer comprising a first ingredient of a first flavor or color;

(b) removing with a stream of pressurized gas a portion of said first outer layer;

(c) inserting a second liquid comprising ingredients of a second flavor or color into said mold; and (d) freezing said second liquid.

52. The method of claim 51, wherein said gas is air.

53. The method of claim 51, further comprising the step of sanitizing said gas.

54. The method of claim 51, wherein said step of creating said first frozen outer layer comprises:

(a) inserting a first liquid comprising said first ingredient into said mold;

(b) partially freezing said first liquid such that said first liquid comprises said first frozen outer layer and a substantially liquid first inner core;

(c) withdrawing from said mold the liquid comprising said first inner core.

55. The method of claim 51, wherein said step of creating said first frozen outer layer comprises:

(a) partially filling said mold with a first liquid comprising said first ingredient;

(b) inserting a body into said mold such that said first liquid forms an outer layer between said body and said mold;

(c) freezing said first liquid to create said first frozen outer layer; and (d) withdrawing said body from said mold.

56. The method of claim 51, wherein said step of creating said first frozen outer layer comprises:

(a) inserting a body into said mold such that an empty gap exists between said body and said mold;

(b) filling said gap with a first liquid comprising said first ingredient;

(c) freezing said first liquid to form said first frozen outer layer; and (d) withdrawing said body from said mold.

57. The method of claim 51, further comprising the step of withdrawing from said mold a liquid comprising said portion of said first outer layer in liquid form, before said inserting of said second liquid.

58. The method of claim 51, further comprising:

(a) partially freezing said second liquid such that said second liquid comprises a substantially frozen second outer layer and a substantially liquid second inner core;

(b) withdrawing from said mold the liquid comprising said second inner core;

(c) removing with a stream of pressurized gas a first portion of said second outer layer;

(d) inserting a third liquid comprising ingredients of a third flavor or color into said mold; and (e) freezing said third liquid.

59. The method of claim 51, further comprising the step of placing the mold in a freezing section before said inserting of said second liquid.

60. A system for making a frozen confection having a plurality of differently flavored or colored sections, comprising:

(a) means for creating in a mold a first frozen outer layer comprising a first ingredient of a first flavor or color;

(b) means for providing a pressurized gas stream;

(c) means for removing with said pressurized gas stream a first portion of said first outer layer;

(d) means for inserting a second liquid comprising ingredients of a second flavor or color into said mold; and (e) means for freezing said second liquid.

61. The system of claim 60, wherein said means for creating said first frozen outer layer comprises:

(a) means for inserting a first liquid comprising said first ingredient into said mold;

(b) means for partially freezing said first liquid such that said first liquid comprises said first frozen outer layer and a substantially liquid first inner core;

(c) means for withdrawing from said mold the liquid comprising said first inner core.

62. The system of claim 60, wherein said means for creating said first frozen outer layer comprises:

(a) means for partially filling said mold with a first liquid comprising said first ingredient;

(b) means for inserting a body into said mold such that said first liquid forms an outer layer between said body and said mold;

(c) means for freezing said outer layer; and (d) means for withdrawing said body from said outer layer.

63. The system of claim 60, wherein said means for creating a first frozen outer layer comprises:

(a) means for inserting a body into said mold such that an empty gap exists between said body and said mold;

(b) means for filling said gap with a first liquid comprising said first ingredient;

(c) means for freezing said first liquid to create said first frozen outer layer; and (d) means for withdrawing said body from said mold.

64. The system of claim 60, further comprising a controller for manipulating said gas stream.

65. The system of claim 60, wherein said means for removing comprises a pressurized gas nozzle for creating said gas stream, a gas valve for regulating said gas stream, a robotic arm for manipulating said nozzle and a controller for controlling said robotic arm and said valve.

66. The system of claim 60, further comprising means for withdrawing from said mold a liquid comprising said portion of said first outer layer in liquid form.

67. The system of claim 60, further comprising:

(a) means for creating in said mold a second frozen outer layer comprising said second ingredients;

(c) means for providing a second pressurized gas stream;

(d) means for removing with said second pressurized gas stream a first portion of said second frozen outer layer;

(e) means for inserting a third liquid comprising ingredients of a third flavor or color into said mold; and (f) means for freezing said third liquid.

68. The system of claim 60, further comprising a freezing section for subjecting said first outer layer to a temperature below 32° F. during said inserting of said second liquid.

* * * * *